(12) United States Patent
Arcas Serrate et al.

(10) Patent No.: US 12,289,675 B2
(45) Date of Patent: Apr. 29, 2025

(54) MOBILE RADIO DEVICE AND METHOD FOR SELECTING CANDIDATE BASE STATIONS

(71) Applicant: AIRSPAN IP HOLDCO LLC, Boca Raton, FL (US)

(72) Inventors: Blanca Arcas Serrate, London (GB); Venkateswarlu Katepalli, Slough (GB); Krzysztof Dudzinski, Slough (GB); Andrew Logothetis, High Wycombe (GB)

(73) Assignee: AIRSPAN IP HOLDCO LLC, Boca Raton, FL (US)

( * ) Notice: Subject to any disclaimer, the term of this patent is extended or adjusted under 35 U.S.C. 154(b) by 401 days.

(21) Appl. No.: 17/824,519

(22) Filed: May 25, 2022

(65) Prior Publication Data

US 2022/0386231 A1 Dec. 1, 2022

(30) Foreign Application Priority Data

May 28, 2021 (GB) ...................................... 2107638

(51) Int. Cl.
*H04W 48/20* (2009.01)
*H04B 7/185* (2006.01)
*H04W 64/00* (2009.01)

(52) U.S. Cl.
CPC ........ *H04W 48/20* (2013.01); *H04B 7/18506* (2013.01); *H04W 64/00* (2013.01)

(58) Field of Classification Search
CPC ..... H04W 48/20; H04W 64/00; H04W 48/16; H04W 88/021; H04W 48/04; H04B 7/18506
See application file for complete search history.

(56) References Cited

U.S. PATENT DOCUMENTS

| | | | | |
|---|---|---|---|---|
| 10,813,103 | B1* | 10/2020 | Sevindik | H04W 48/20 |
| 2006/0030350 | A1 | 2/2006 | Mitchell | |
| 2006/0229103 | A1* | 10/2006 | Monk | H01Q 3/2658 |
| | | | | 455/562.1 |

(Continued)

OTHER PUBLICATIONS

GB Search Report from GB2107638.5 dated Mar. 10, 2022, 4 pages.

*Primary Examiner* — Julio R Perez
(74) *Attorney, Agent, or Firm* — Haynes Beffel & Wolfeld LLP; Andrew L. Dunlap

(57) ABSTRACT

There is provided a mobile radio device and a method of operating a mobile radio device. The mobile radio device is provided with storage circuitry to store location information defining locations of a first plurality of base stations. The mobile radio device is further provided with connection circuitry to make an attempt to connect to a candidate base station of the first plurality of base stations using a beam steered in a direction of the candidate base station, and to receive signals from the direction of the candidate base station. The mobile radio device is further provided with calculation circuitry to generate, based on the received signals, status information defining a connectivity characteristic of each of a second plurality of base stations, and to calculate a ranked list of candidate base stations from the first plurality of base stations and the second plurality of base stations. The mobile radio device is further provided with selection circuitry to select a next candidate base station to attempt to connect to based on the ranked list of candidates.

23 Claims, 14 Drawing Sheets

(56) References Cited

U.S. PATENT DOCUMENTS

Figure 1:
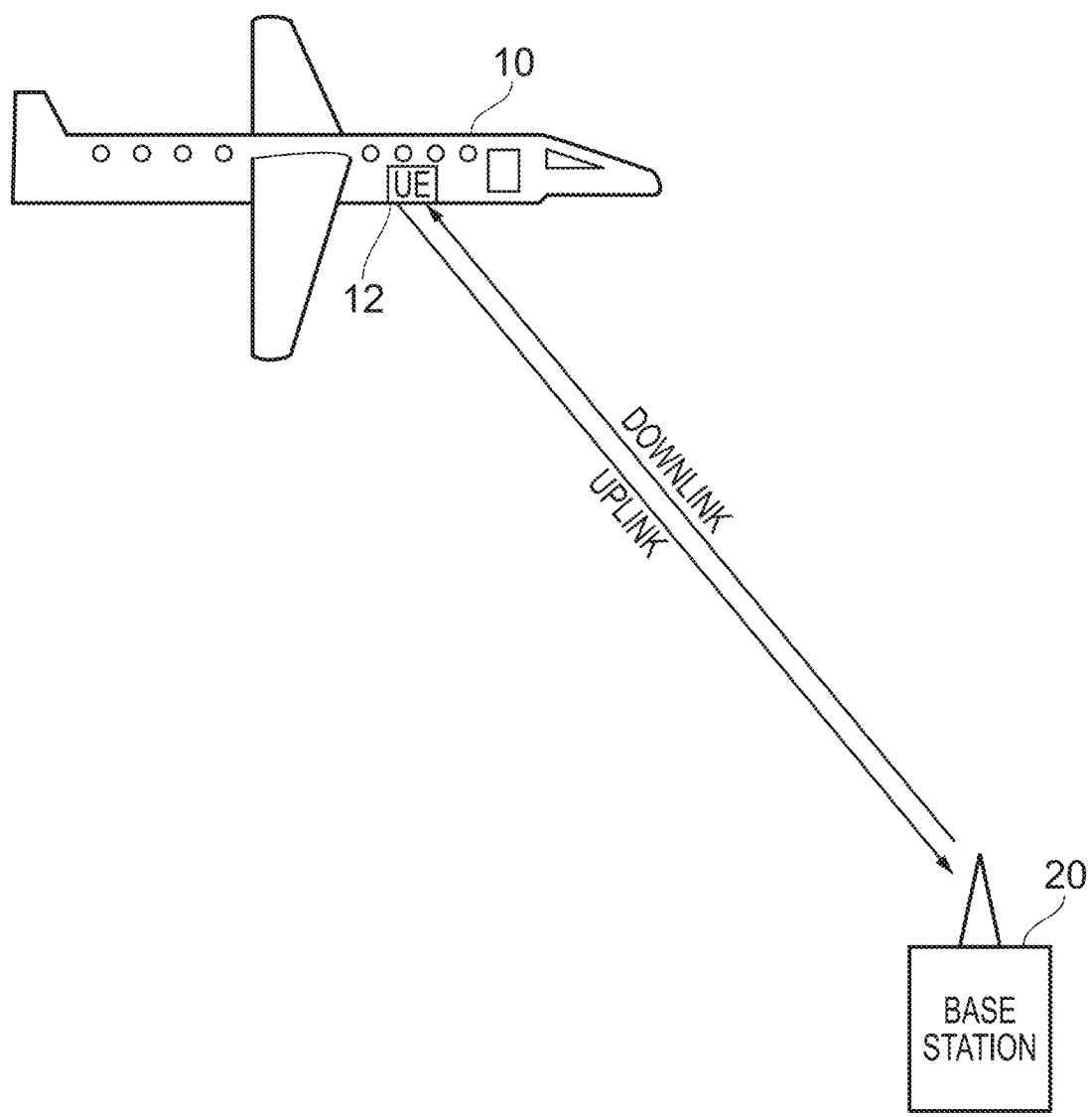

| | | | |
|---|---|---|---|
| 2016/0262077 A1* | 9/2016 | Zhang | H04W 36/0085 |
| 2016/0323780 A1* | 11/2016 | Bhanage | H04W 76/18 |
| 2017/0111886 A1* | 4/2017 | Kim | H04W 48/14 |
| 2017/0142650 A1* | 5/2017 | Wang | H04B 17/318 |
| 2017/0150373 A1 | 5/2017 | Brennan et al. | |
| 2018/0160364 A1* | 6/2018 | Wang | H04W 24/10 |
| 2018/0247544 A1 | 8/2018 | Mustafic et al. | |
| 2018/0295599 A1* | 10/2018 | Bitra | G01S 5/021 |
| 2022/0386231 A1* | 12/2022 | Arcas Serrate | H04B 7/18506 |
| 2023/0140805 A1* | 5/2023 | Chari | H04W 48/20 370/329 |
| 2024/0049126 A1* | 2/2024 | Majumder | H04W 72/542 |

* cited by examiner

CCList_Obj = DGC

CCList_Obj = A U B = (UGC ∩ DGC) U (DGC ∩ UGC')

CCList_Obj = A U B U C U D

A = UGC ∩ NGC ∩ DGC

B = (NGC ∩ DGC) ∩ UGC'

C = (UGC ∩ DGC) ∩ NGC'

D = DGC ∩ (UGC U NGC)'

MOBILE RADIO DEVICE AND METHOD FOR SELECTING CANDIDATE BASE STATIONS

In radio communication mobile radio devices can be configured to connect to base stations selected from a list of candidate base stations that are at known locations.

However, not all candidate base stations are able to provide the same level of connectivity and it is not until the radio device attempts to connect to a base station that the connectivity is known. As a result, the mobile radio device may need to attempt to connect to plural base stations before one with a satisfactory connectivity characteristic can be determined.

In accordance with some example configurations there is provided a mobile radio device comprising:

storage circuitry to store location information defining locations of a first plurality of base stations;

connection circuitry to make an attempt to connect to a candidate base station of the first plurality of base stations using a beam steered in a direction of the candidate base station, and to receive signals from the direction of the candidate base station;

calculation circuitry to generate, based on the received signals, status information defining a connectivity characteristic of each of a second plurality of base stations, and to calculate a ranked list of candidate base stations from the first plurality of base stations and the second plurality of base stations; and selection circuitry to select a next candidate base station to attempt to connect to based on the ranked list of candidates.

In accordance with some example configurations there is provided a method of operating a mobile radio device comprising:

storing location information defining locations of a first plurality of base stations;

attempting to connect to a candidate base station of the first plurality of base stations using a beam steered in a direction of the candidate base station, and to receive signals from the direction of the candidate base station;

generating, based on the received signals, status information defining a connectivity characteristic of each of a second plurality of base stations, and to calculate a ranked list of candidate base stations from the first plurality of base stations and the second plurality of base stations; and selecting a next candidate base station to attempt to connect to based on the ranked list of candidates.

In accordance with some example configurations there is provided a mobile radio device comprising:

means for storing location information defining locations of a first plurality of base stations;

means for attempting to connect to a candidate base station of the first plurality of base stations using a beam steered in a direction of the candidate base station, and to receive signals from the direction of the candidate base station;

means for generating, based on the received signals, status information defining a connectivity characteristic of each of a second plurality of base stations, and to calculate a ranked list of candidate base stations from the first plurality of base stations and the second plurality of base stations; and means for selecting a next candidate base station to attempt to connect to based on the ranked list of candidates.

Figure 2:
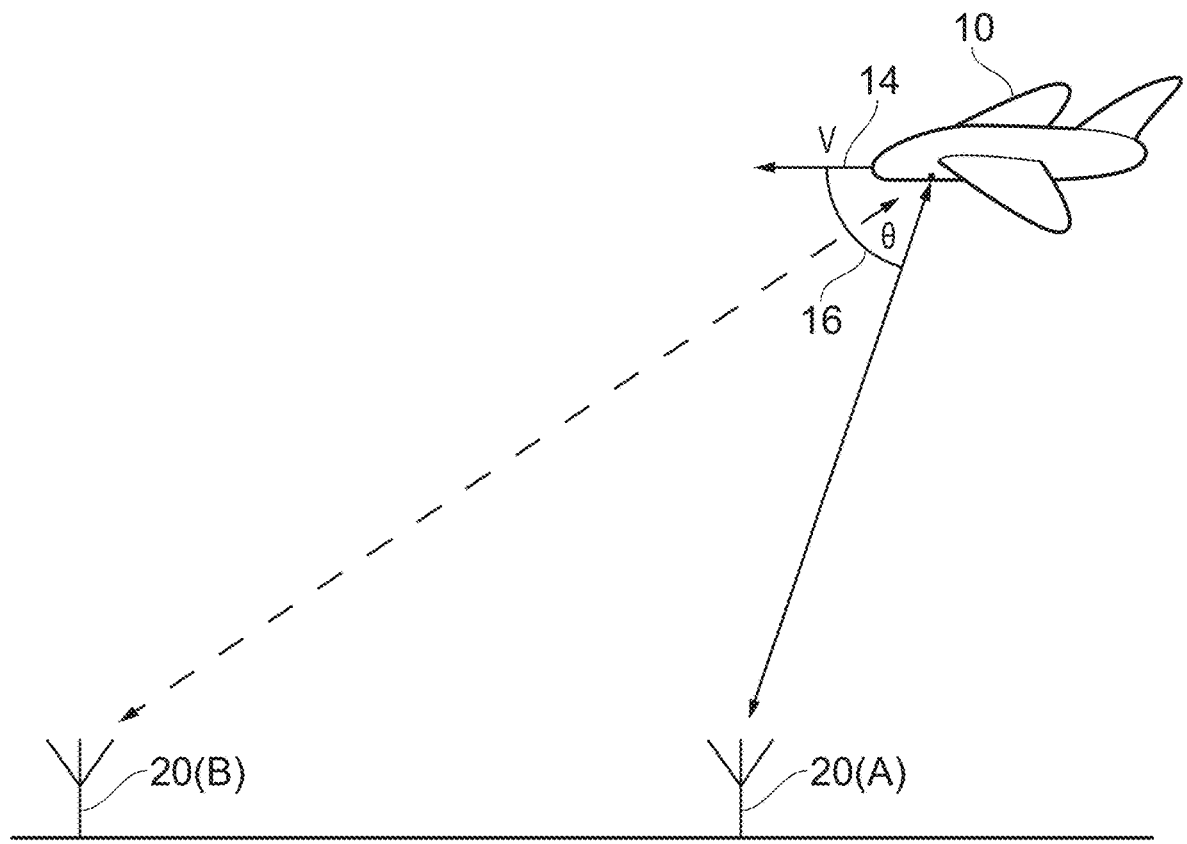
Figure 3A:
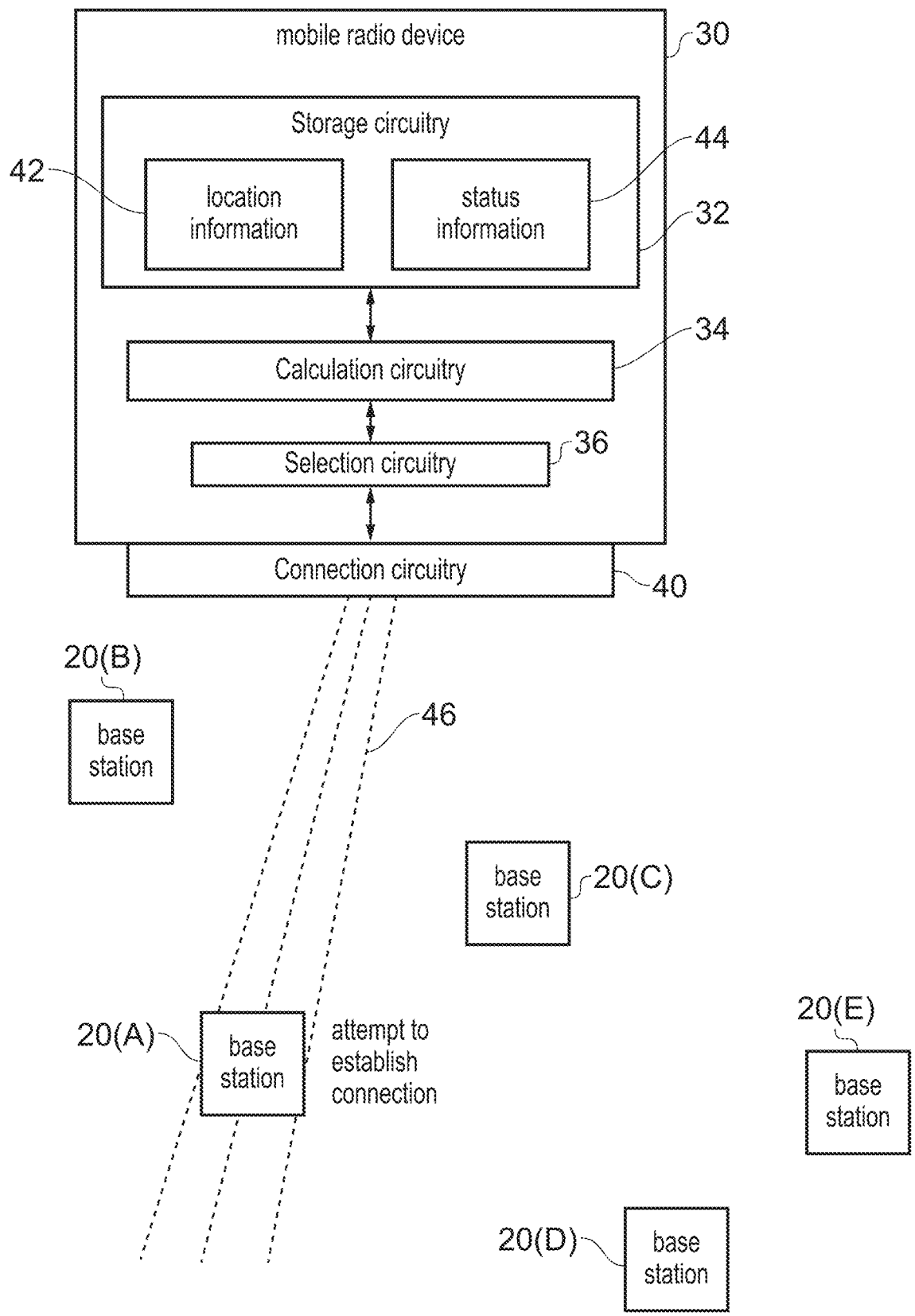
Figure 3B:
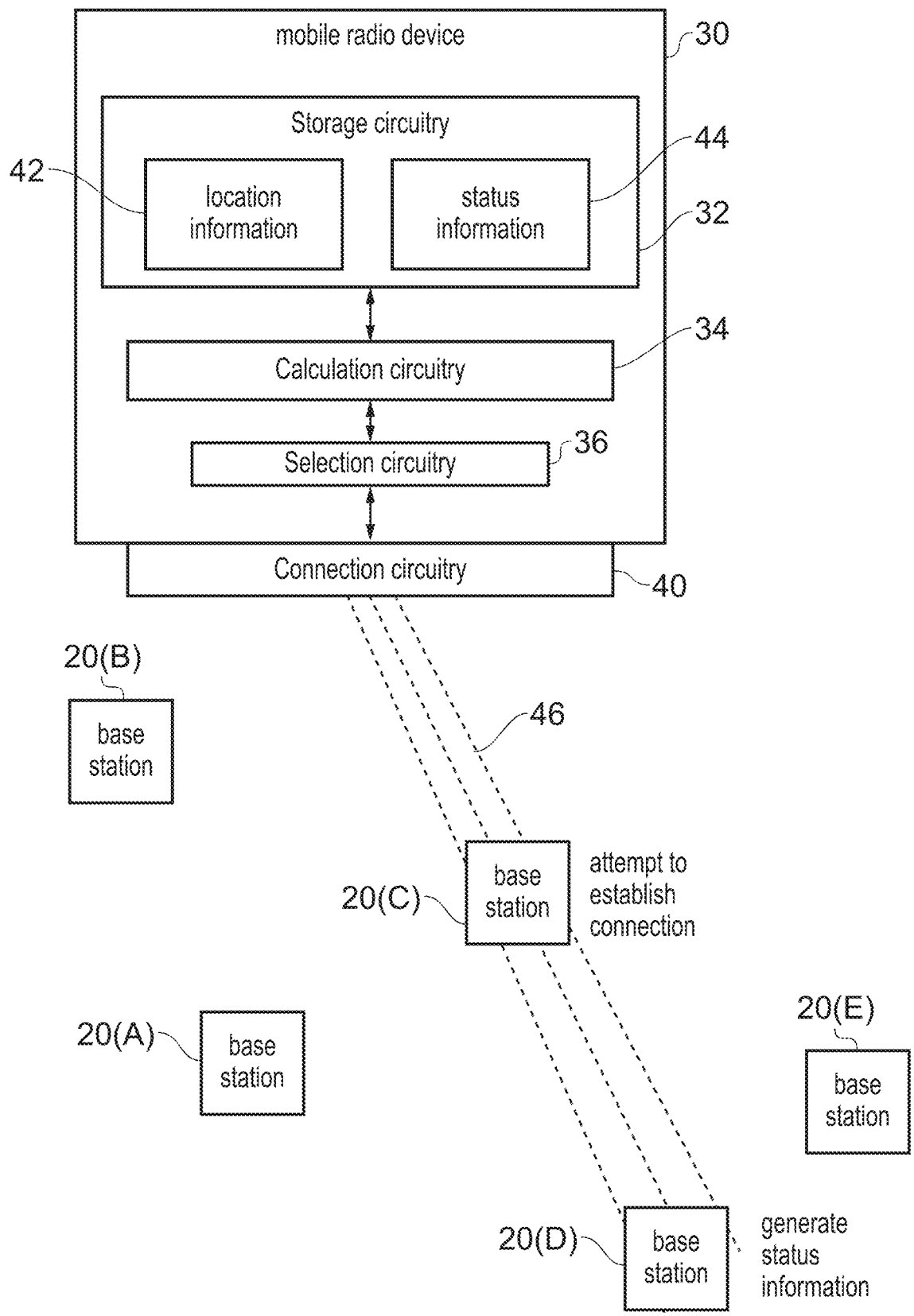
Figure 3C:
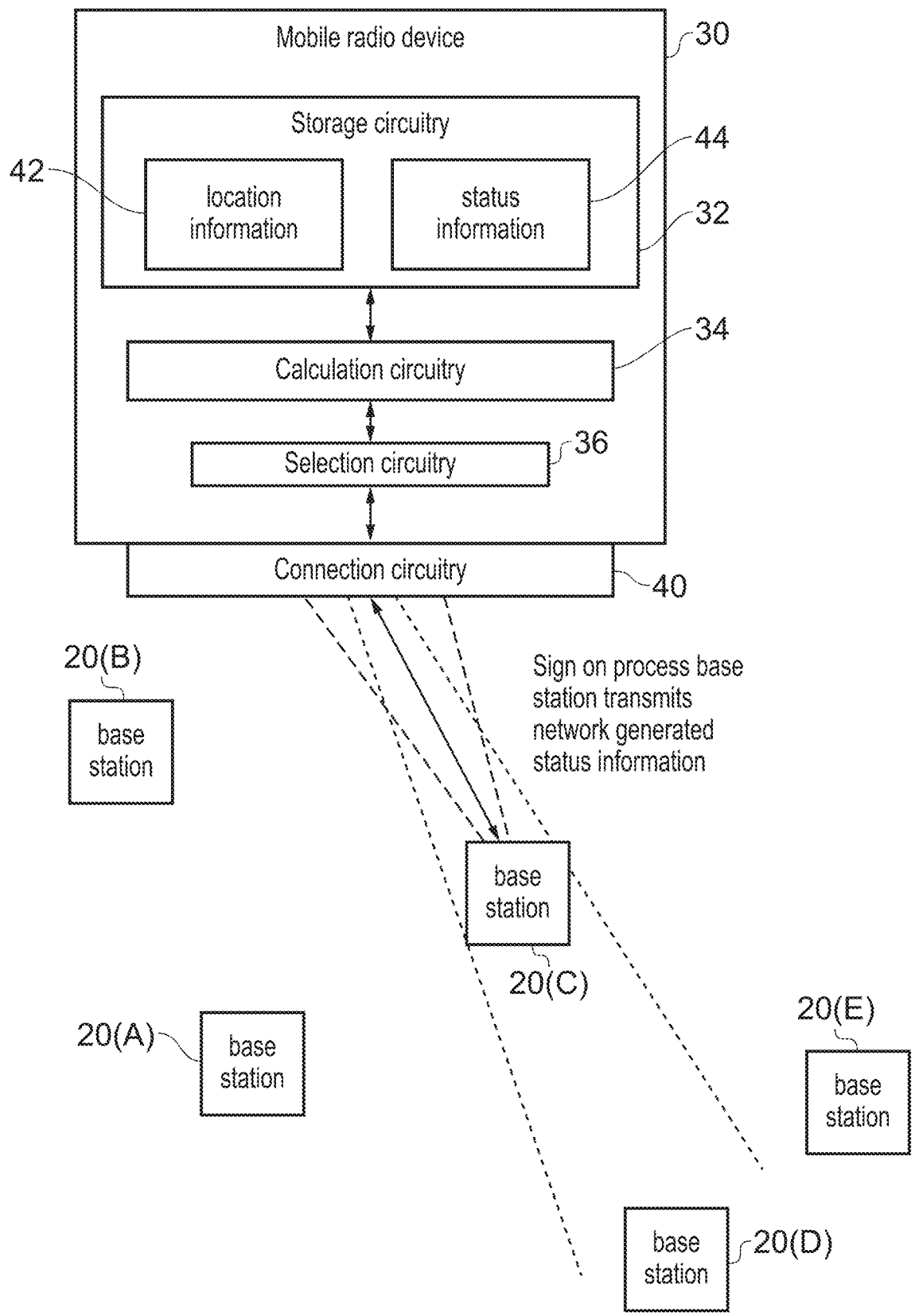
Figure 4:
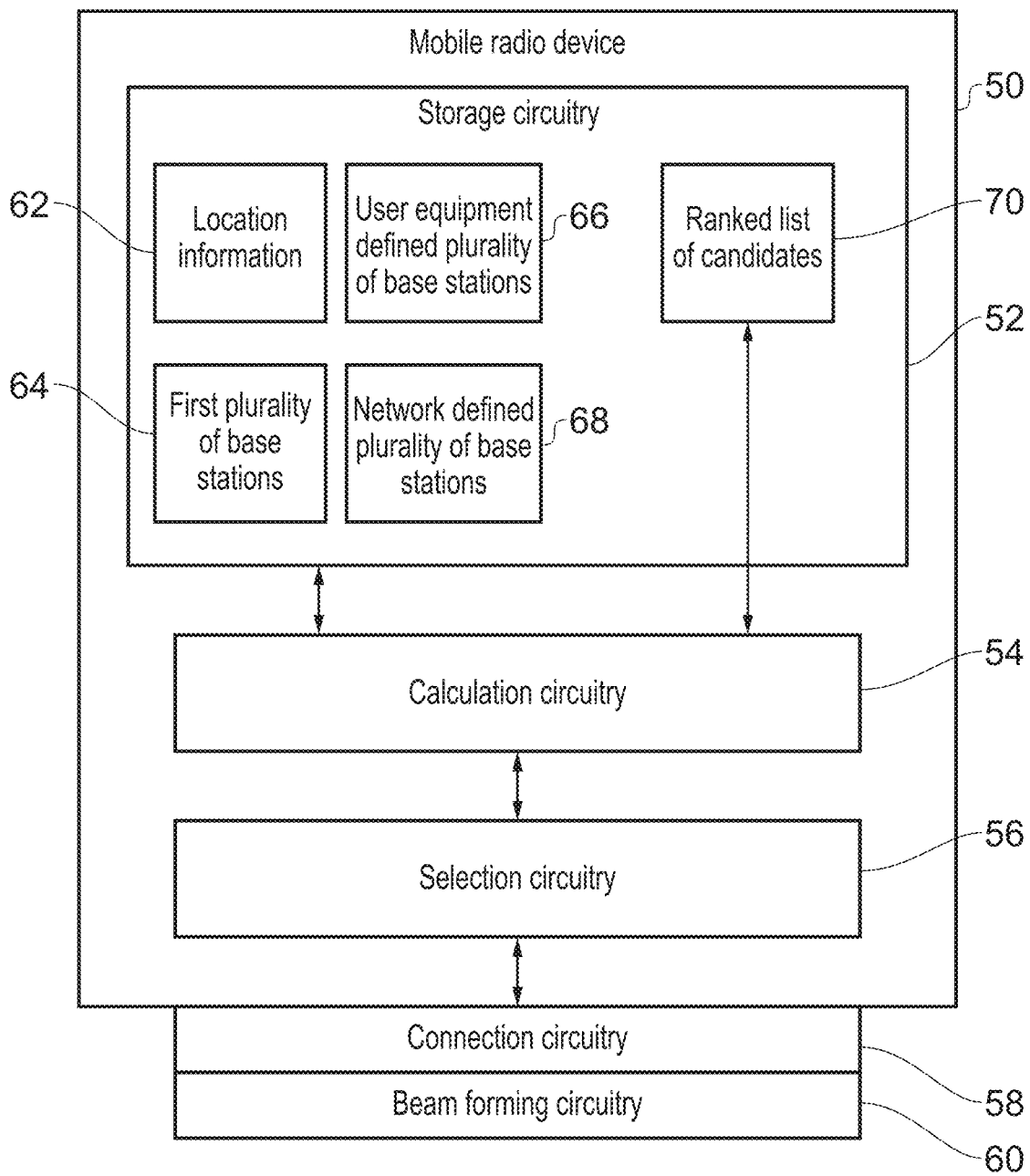
Figure 5A:
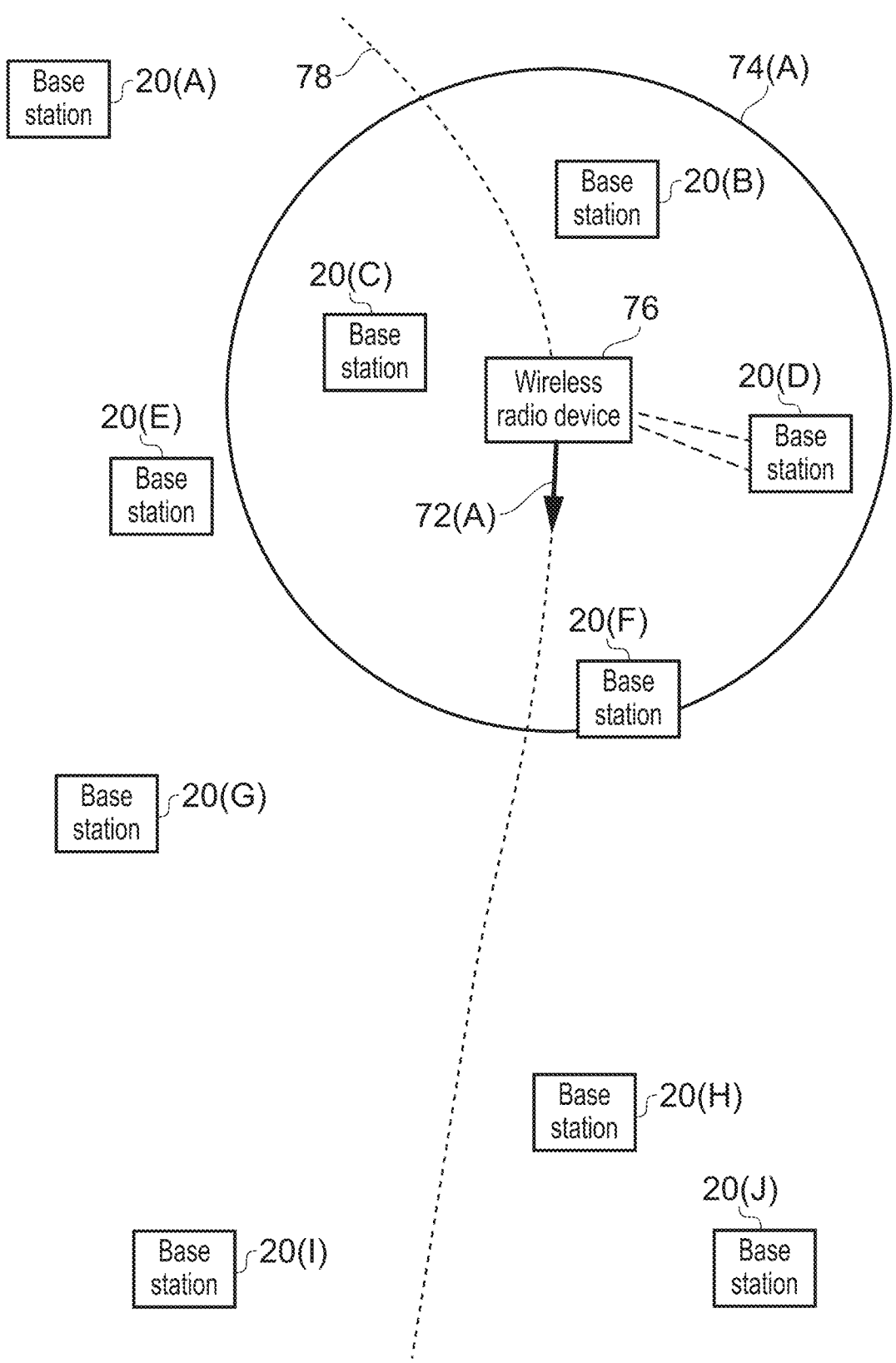
Figure 5B:
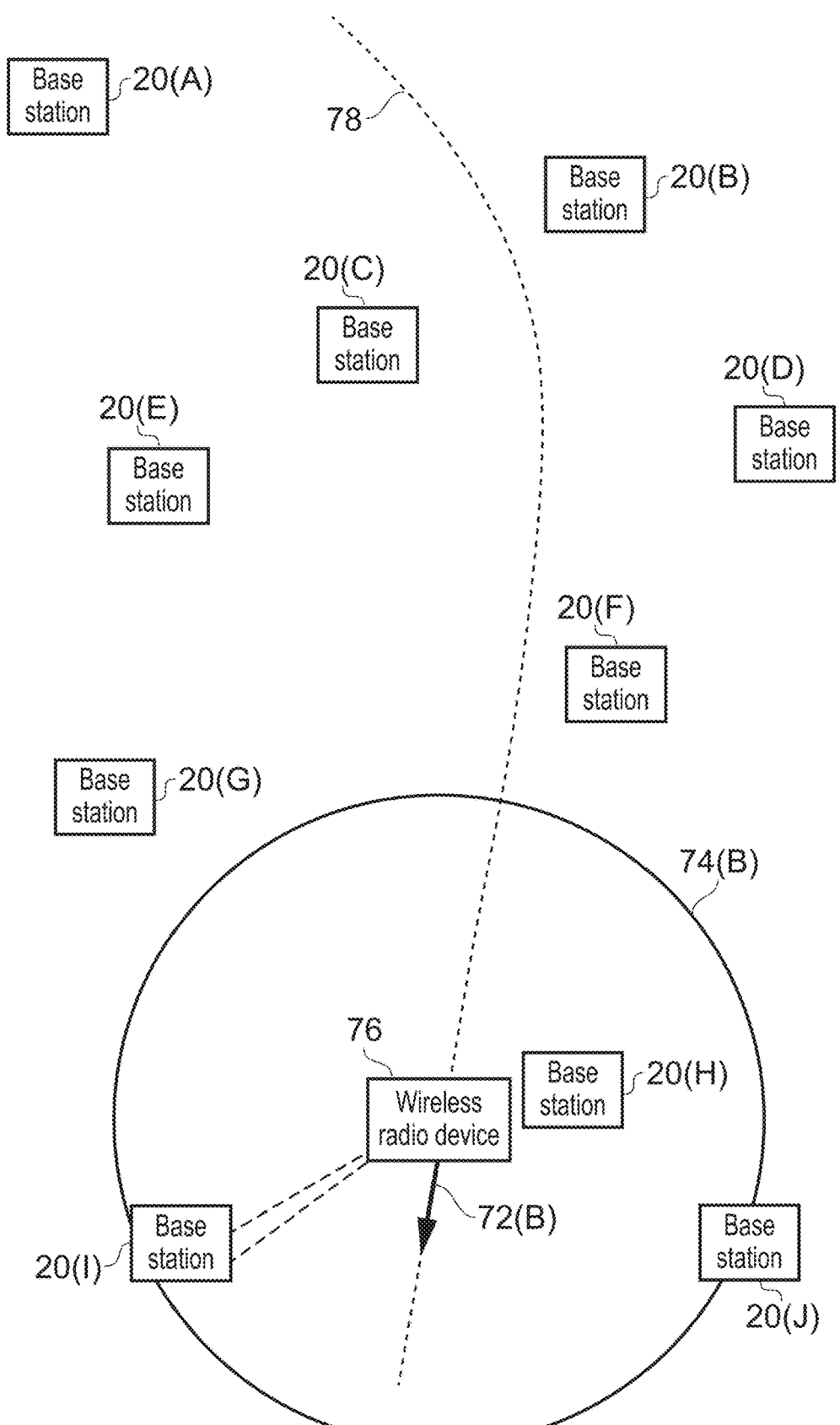
Figure 6:
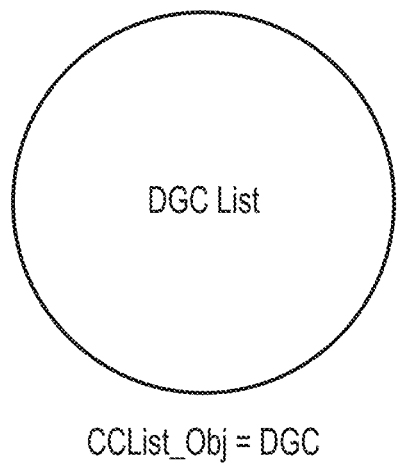
Figure 7:
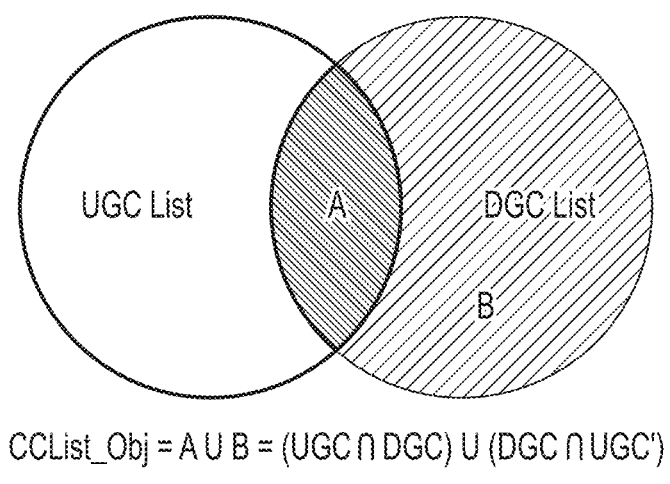
Figure 8:
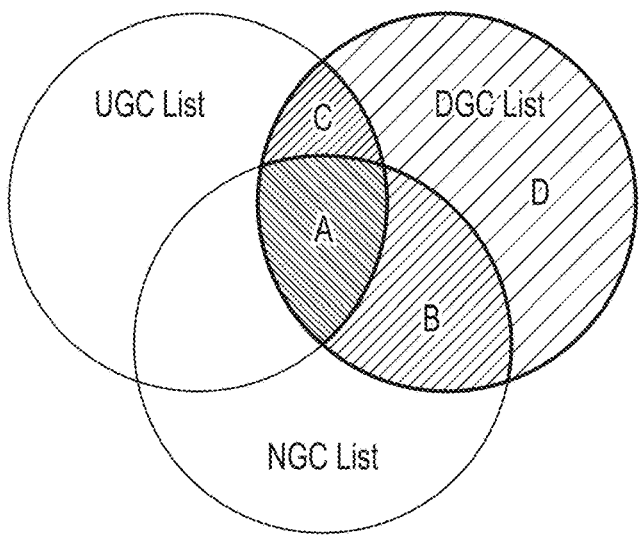
Figure 9A:
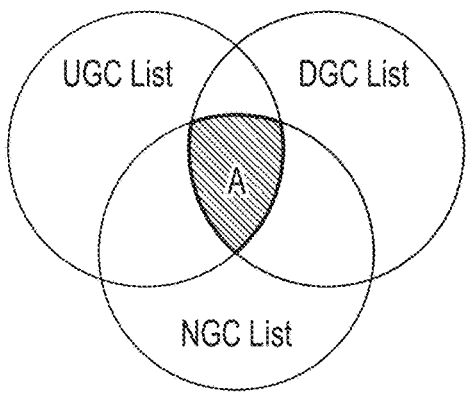
Figure 9B:
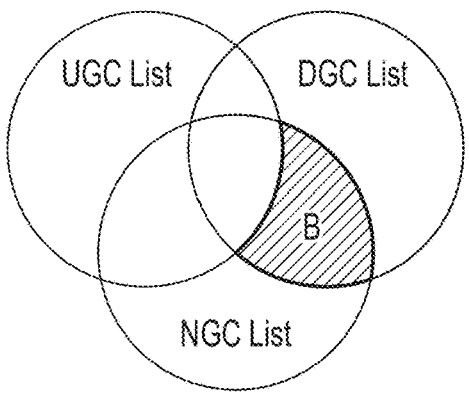
Figure 9C:
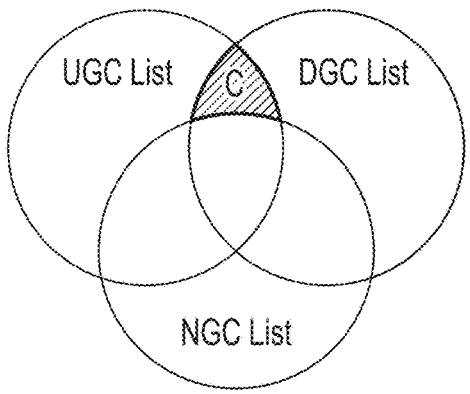
Figure 9D:
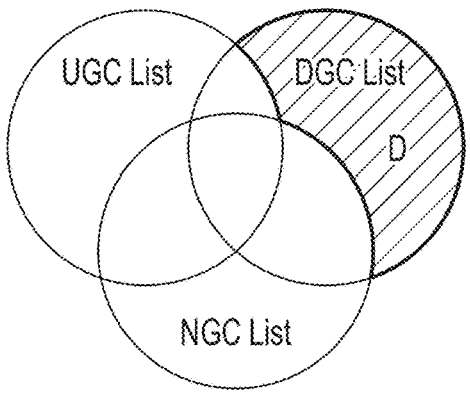
Figure 10:
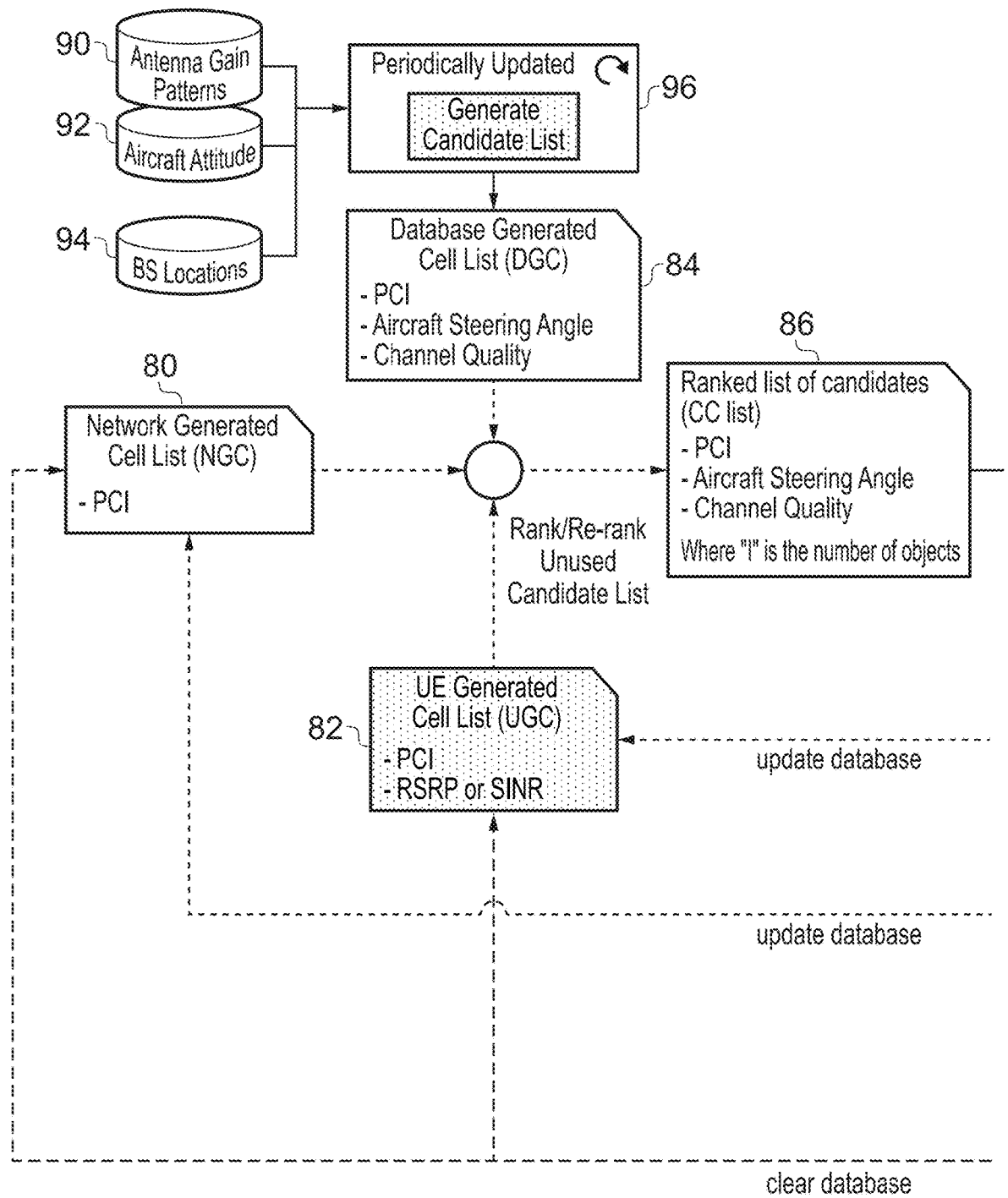
Figure 10:
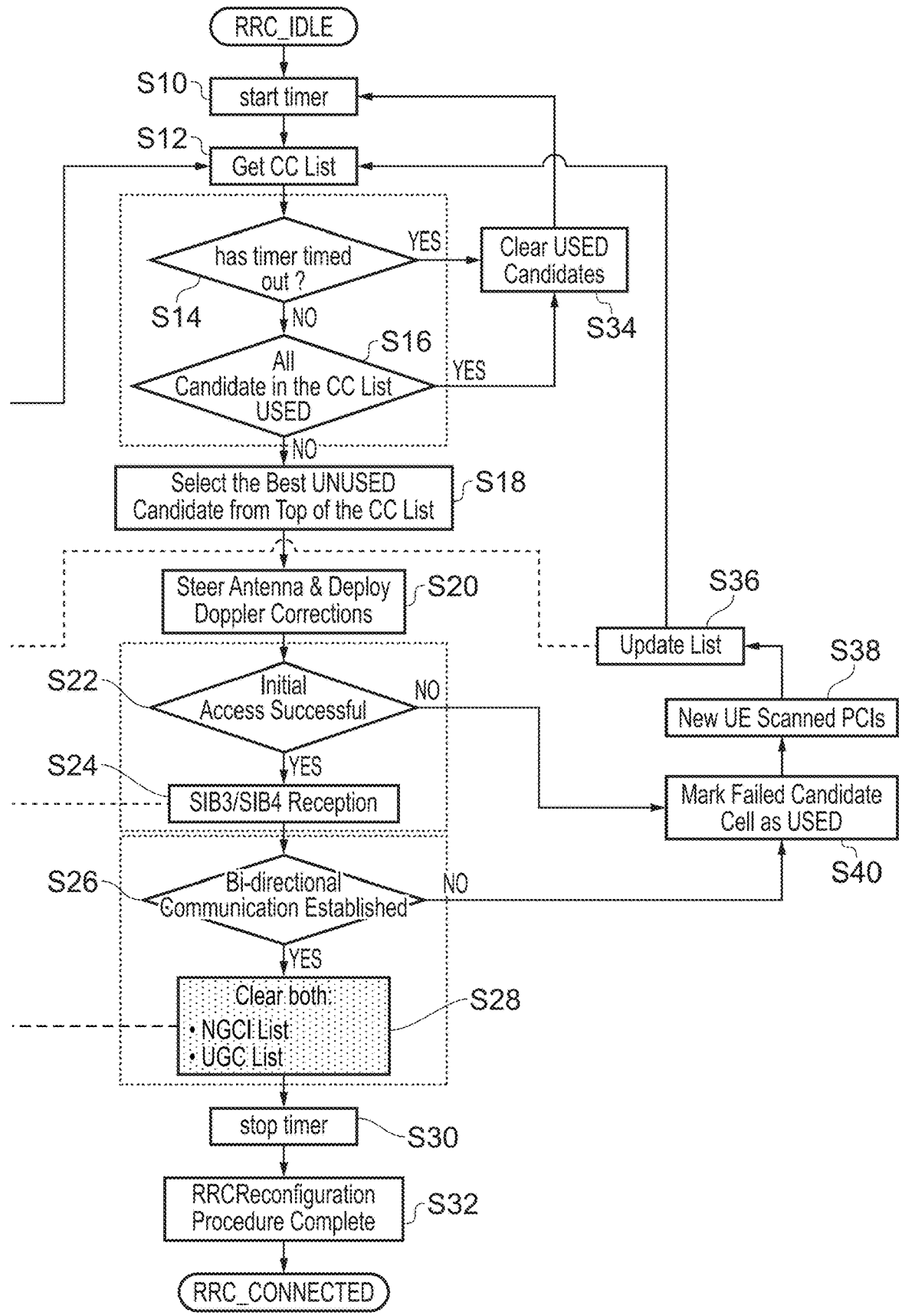
Figure 11:
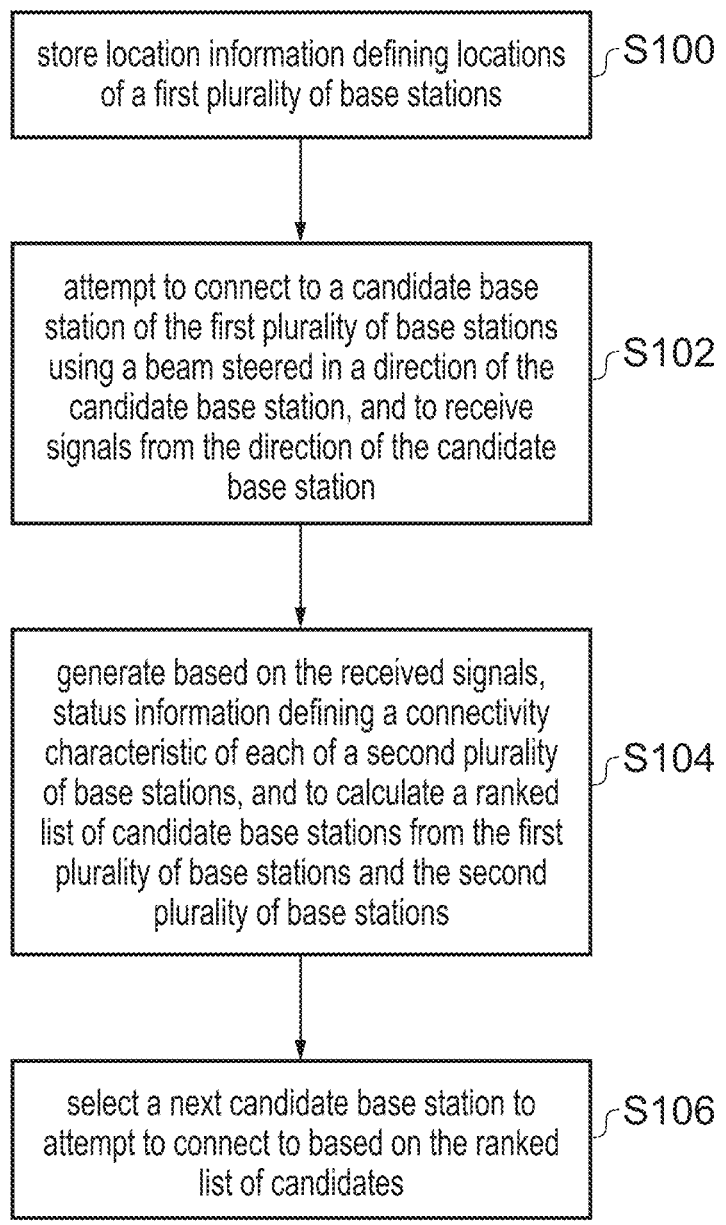
Figure 12:
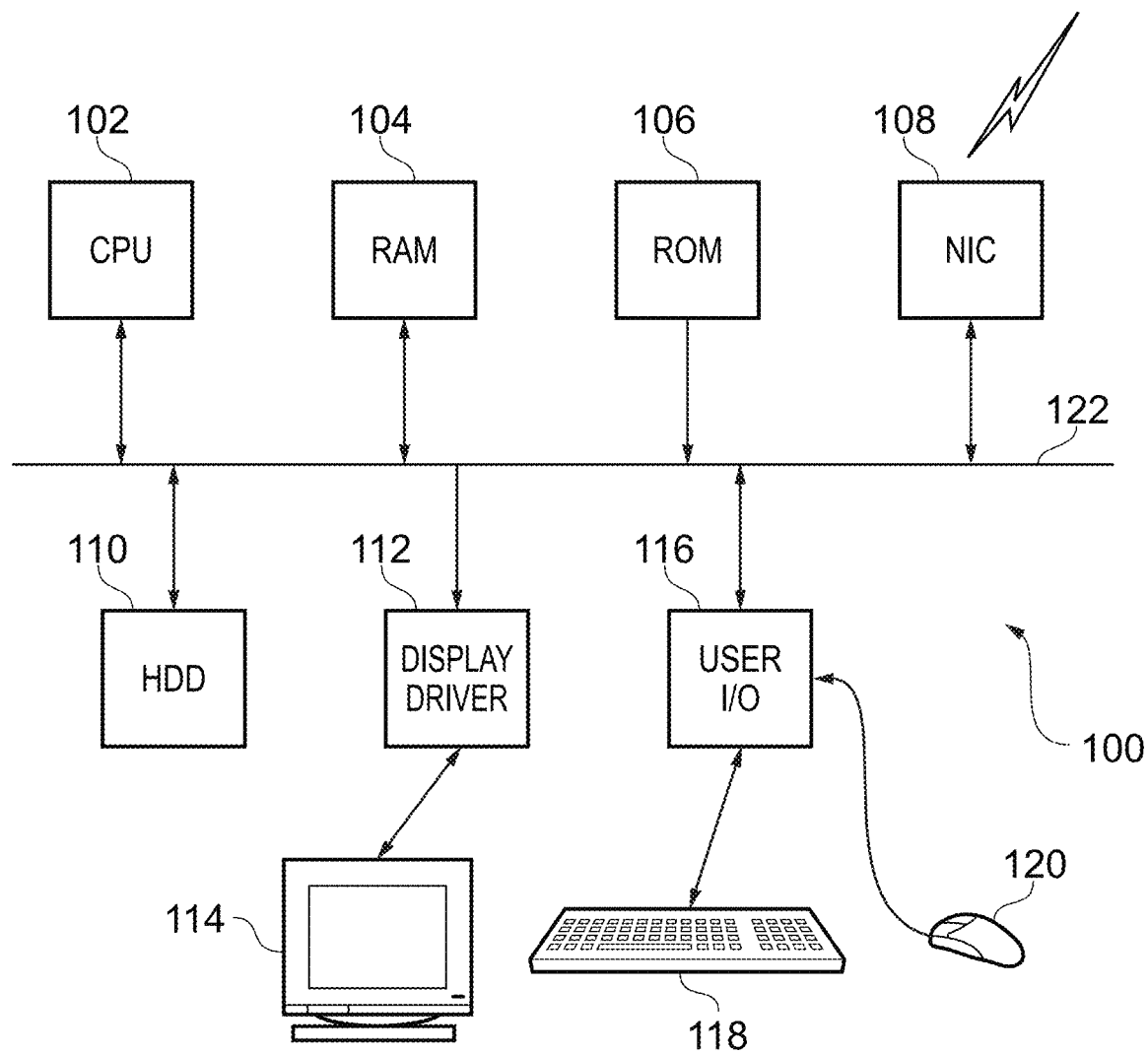

The present techniques will be described further, by way of example only, with reference to embodiments thereof as illustrated in the accompanying drawings, in which:

FIG. 1 schematically illustrates a mobile radio device according to some configurations of the present techniques;

FIG. 2 schematically illustrates a mobile radio device according to some configurations of the present techniques;

FIG. 3a schematically illustrates a connection process of a mobile radio device according to some configurations of the present techniques;

FIG. 3b schematically illustrates a connection process of a mobile radio device according to some configurations of the present techniques;

FIG. 3c schematically illustrates a connection process of a mobile radio device according to some configurations of the present techniques;

FIG. 4 schematically illustrates details of a mobile radio device according to some configurations of the present techniques;

FIG. 5a schematically illustrates details of a connection processes according to some configurations of the present techniques;

FIG. 5b schematically illustrates details of a connection processes according to some configurations of the present techniques;

FIG. 6 schematically illustrates generation of a ranked list according to some configurations of the present techniques;

FIG. 7 schematically illustrates generation of a ranked list according to some configurations of the present techniques;

FIG. 8 schematically illustrates generation of a ranked list according to some configurations of the present techniques;

FIG. 9a schematically illustrates generation of a ranked list according to some configurations of the present techniques;

FIG. 9b schematically illustrates generation of a ranked list according to some configurations of the present techniques;

FIG. 9c schematically illustrates generation of a ranked list according to some configurations of the present techniques;

FIG. 9d schematically illustrates generation of a ranked list according to some configurations of the present techniques;

FIG. 10 schematically illustrates a sequence of steps carried out according to some configurations of the present techniques;

FIG. 11 schematically illustrates a sequence of steps carried out according to some configurations of the present techniques; and FIG. 12 schematically illustrates a data processing apparatus for carrying out some configurations of the present techniques.

At least some configurations provide a mobile radio device comprising storage circuitry to store location information defining locations of a first plurality of base stations. The mobile radio device further comprises connection circuitry to make an attempt to connect to a candidate base station of the first plurality of base stations using a beam steered in a direction of the candidate base station, and to receive signals from the direction of the candidate base station. The mobile radio device further comprises calculation circuitry to generate, based on the received signals, status information defining a connectivity characteristic of each of a second plurality of base stations, and to calculate a ranked list of candidate base stations from the first plurality of base stations and the second plurality of base stations. The mobile radio device further comprises selection circuitry to select a next candidate base station to attempt to connect to based on the ranked list of candidates.

Using the location information the mobile radio device is able to scan through base stations by steering (directing) the beam towards each candidate base station in turn in order to make an attempt to establish a connection to the candidate base station. Candidate base stations within the first plurality of candidate base stations can be prioritised in a number of ways. For example, the candidate base stations may be prioritised based on a distance between the mobile radio device and the base station. Alternatively (or additionally), the candidate base stations may be selected to minimise the change in beam steering angle between sequential attempts to connect to the base stations. The process of scanning through the first plurality of base stations can be time consuming and for a mobile radio device could occur frequently when the mobile radio device is in motion. Furthermore, if the selected candidate base station is offline or otherwise unsuitable for receiving connections at the time when a connection attempt is made, then the mobile radio device would have to make further attempts to connect to different candidate base stations before one with an appropriate connectivity characteristic can be determined. The inventors have realised that the time spent selecting an appropriate candidate base station can be reduced by making use of status information relating to the plurality of base stations that is received (obtained) whilst making the attempt to connect to the candidate base station. Such status information, relating to a connectivity characteristic of a second plurality of base stations, can be received by the connection circuitry. This information can be used in combination with the location information to generate a ranked (prioritised) list of candidate base stations in order to select a next candidate base station from the ranked list. For example, the selection circuitry could be configured to select the highest ranked base station from the ranked list, or the highest ranked base station for which a connection attempt has not already been made.

The status information can take a variety of forms and can be received from different sources. However, in some example configurations the status information comprises user equipment generated status information defining a user equipment defined plurality of base stations; and the user equipment generated status information is generated by the control circuitry during the attempt to connect to the candidate base station based on signals received from all base stations visible to the mobile radio device in the direction of the candidate base station. The user equipment generated status information can be generated in a number of different ways. For example, the user equipment generated status information may comprise a list of all base stations visible to the mobile radio device from which a signal has been received. Alternatively, the user equipment generated status information may comprise only base stations of the base stations visible to the mobile radio device for which the received signal strength is greater than a threshold level. When the mobile radio device is making the attempt to connect to the candidate base station, the connection circuitry can pick up signals (beams) from the candidate base station and from base stations different to the candidate base station that are visible to the mobile radio device. In some example configurations base stations that are visible to the mobile radio device comprise base stations that are in a direct line of sight of the mobile radio device. In other example configurations, base stations that are visible to the mobile radio device may include all those that are within the radio horizon of the mobile radio device. The radio horizon of the mobile radio device is the furthest possible point of propagation of radio signals from the mobile radio device. The radio horizon does not necessarily coincide with the line of sight of the mobile radio device. Due to effects of the horizon, radio frequency signals do not propagate in straight lines. Rather, because of the canalizing effects of atmospheric layers, the propagation paths of radio frequency signals are curved. As a result the maximum range of the mobile radio device is not equal to the line of sight distance. By including user equipment generated status information the mobile radio device is able to build a list of nearby base stations which are known to be actively transmitting.

The calculation circuitry can calculate the ranked list in a number of different ways. In some example configurations, when the status information comprises user equipment generated status information defining a user equipment defined plurality of base stations, the calculation circuitry is configured to generate the ranked list of candidates such that: the ranked list of candidates prioritises a first subset of candidates ranked ahead of a second subset of candidates; the first subset of candidates comprises an intersection of the first plurality of base stations and the user equipment defined plurality of base stations; and the second subset of candidates comprises the first plurality of base stations excluding the user equipment defined plurality of base stations. In this way the mobile radio device is able to prioritise base stations for which status information has been received. The mobile radio device is able to fall back to attempting to connect to base stations that are in the first plurality of base stations, but for which no status information has been received. The user equipment defined plurality of base stations may further comprise a final subset of base stations that do not form part of the first plurality of base stations. Such base stations may belong to a different network or be base stations that have come online or updated since the location information defining the first plurality of base stations was populated. In some example configurations the first subset of base stations, the second subset of base stations, and the final subset of base stations are non-overlapping subsets that comprise all the base stations in the first plurality of base stations and the user equipment defined plurality of base stations.

In some example configurations the calculation circuitry is configured to rank the second subset of candidates based on a metric of predicted connection strength of each of the second subset of candidates. The second subset of candidates is ranked (prioritised) such that the base stations in the second subset of candidates are ranked in order of predicted connection strength with the higher predicted connection strength candidates being ranked higher than the lower predicted connection strength candidates. In this way the mobile radio device is able to prioritise the base stations for which it is predicted that there will be a stronger connection.

As discussed above, the status information can take a variety of forms and can be received from different sources. In some configurations the status information comprises network generated status information received by the mobile radio device from the candidate base station defining a network defined plurality of base stations; and the network generated status information is generated based on data encoded within a signal received from the candidate base station during a sign-on process of the attempt to connect to the candidate base station. In addition to the user equipment generated status information, the network generated status information provides additional information by which the mobile radio device can rank the base stations. The base stations to which the mobile radio device is attempting to connect may exchange status information regarding a connectivity state. When the mobile radio device attempts to connect to the candidate base station the exchanged status information can be transmitted to the mobile radio device. In this way the mobile radio device is able to build up network generated status information relating to a current status of a plurality of base stations different to the candidate base station. In some example configurations the network defined plurality of base stations comprises only base stations which are available for connection. In other alternative configurations the network defined plurality of base stations comprises base stations available for connection with an available bandwidth greater than a threshold bandwidth.

In some configurations, when the status information comprises information received by the mobile radio device from the candidate base station defining a network defined plurality of base stations, the calculation circuitry is configured to generate the ranked list of candidates such that: the ranked list of candidates prioritises a first subset of candidates; and the first subset of candidates comprising an intersection of the first plurality of base stations, the user equipment defined plurality of base stations, and the network defined plurality of base stations. In this way the mobile radio device is able to prioritise base stations for which network generated status information has been received from a previous base station to which a previous connection attempt was made and for which user equipment generated status information has been generated during a previous connection attempt. The first subset of candidates can be ranked in various ways. In some configurations the calculation circuitry is configured to rank the first subset of candidates based on the connectivity characteristic of each of the first subset of candidates, and the connectivity characteristic is at least one of: a reference signal received power; and a received signal-to-interference-and-noise ratio.

In some configurations the calculation circuitry is configured to generate the ranked list of candidates such that: the ranked list of candidates prioritises a second subset of candidates ranked below the first subset of candidates; and the second subset of candidates comprises an intersection of the first plurality of base stations and the network defined plurality of base stations excluding the user equipment defined plurality of base stations. By grouping the base stations in this way the mobile radio device is able to first prioritise the base stations for which the greatest amount of information is available. The mobile radio device first attempts to connect to base stations that are included in each of the first plurality of base stations, the user defined plurality of base stations and the network defined plurality of base stations. If no such base station can be connected to then the mobile radio device moves on to base stations which are included in the first plurality of base stations and the network defined plurality of base stations.

The second subset of candidates can be ranked using various methods. However, in some configurations the calculation circuitry is configured to rank the second subset of candidates based on a metric of predicted connection strength of each of the second set of candidates. In particular, the second subset of candidates can be ranked such that base stations within the second subset of candidates that have a higher connection strength are prioritised higher in the second subset of candidates that those that have a lower connection strength.

In some configurations the calculation circuitry is configured to generate the ranked list of candidates such that: the ranked list of candidates prioritises a third subset of candidates ranked below the first subset of candidates; and the third subset of candidates comprises an intersection of the first plurality of base stations and the user equipment defined plurality of base stations excluding the network defined plurality of base stations. As discussed, if there are no base stations to which the mobile radio device can connect in the first subset of candidates then the mobile radio device considers further subsets of base stations. By prioritising base stations that are included in both the first plurality of base stations and the user defined plurality of base stations in the ranked list, the mobile radio device is able to ensure that the mobile radio device first attempts to connect to base stations for which the mobile radio device has received status information.

The prioritisation of the second subset of candidates and the third subset of candidates can be defined in various ways. For example, the second and third subset of candidates could be given equal priority or one of the second subset of candidates and the third subset of candidates could be prioritised above the other. In some configurations the calculation circuitry is configured to rank the third subset of candidates below the second subset of candidates. By ranking the second subset of candidates above the third subset of candidates, the mobile radio device is able to consider base stations for which the network has reported status information above those for which the network has not reported status information. Hence, information provided directly from the network is prioritised above the stations that have been detected by the mobile radio device when attempting to connect to a candidate base station.

Within the third subset of candidates the mobile radio device can prioritise the base stations in a variety of ways. In some example configurations the calculation circuitry is configured to generate the third subset of candidates such that it is ranked based on the connectivity characteristic of each of the third subset of candidates, and the connectivity characteristic is at least one of a reference signal received power; and a received signal-to-interference-and-noise ratio. Candidates of the third subset of candidates with a higher connectivity characteristic are ranked above those with a lower connectivity characteristic. In some configurations the second subset of candidates can be ranked based on a weighted combination of both the reference signal received power and the received signal-to interference-and-noise ratio.

In some configurations the calculation circuitry is configured to generate the ranked list of candidates such that: the ranked list of candidates prioritises a fourth subset of candidates below the first subset of candidates; and the fourth subset of candidates comprises each of the first plurality of base stations excluding the network defined plurality of base stations and excluding the user equipment defined plurality of base stations. The fourth subset of candidates comprises candidate base stations of the first plurality of base stations that are not included in the user equipment defined plurality of base stations or the network defined plurality of base stations. By incorporating the fourth subset of candidates in the ranked list of candidates along with the first, second and third subset of candidates, the ranked list of candidates comprises all base stations in the first plurality of base stations. In this way the mobile radio device has a same number of candidate base stations to consider as those included in the original first plurality of base stations with the advantage that the candidates are ranked increasing the chance of a successful connection attempt in fewer tries. In some example configurations the ranked list of candidates prioritises the fourth subset below the second subset of candidates and below the third subset of candidates. Hence, candidate base stations from the first plurality of base stations that are not included in the user equipment defined plurality of base stations or the network defined plurality of base stations (i.e., the candidates for which the mobile radio device has least information) are prioritised lower than those candidates for which additional information has been obtained.

In some configurations the location information defines the locations of each of the plurality of base stations relative to the mobile radio device. In this way the selection circuitry is able to select from candidate base stations within a predetermined distance of the mobile base station. For example, in some example configurations the plurality of base stations defined in the location information comprises base stations within radio horizon of the mobile radio device. As discussed the radio horizon is the furthest possible point of propagation of radio signals from the mobile radio device. Due to effects of the horizon radio frequency signals do not propagate in straight lines. Rather, because of the canalizing effects of atmospheric layers, the propagation paths of radio frequency signals are curved.

In some example configurations the mobile radio device is configured to be attached to a mobile vehicle and is configured to dynamically update the location information in the storage circuitry during motion of the mobile vehicle. The location information can therefore be updated during motion of the mobile vehicle. In this way the selection circuitry selects the next candidate base station from a list of base stations that are preselected based on the vehicles position. In some configurations the mobile radio device is configured to be mounted on an aircraft and is configured such that the first plurality of base stations is determined from a location of the aircraft, locations of the base stations, and the aircraft velocity vector. In some configurations the first plurality of base stations comprises all base stations within a fixed distance from the aircraft. In other example configurations the first plurality of base stations comprises all the base stations that will remain within a fixed distance of the aircraft for a given time.

In some example configurations the first plurality of base stations is further based on antenna gain patterns of the beam. The antenna gain patterns of the beam are the antenna gain patterns of the mobile radio device. In some example configurations the first plurality of base stations may be further based on antenna gain patterns of the base station which may be stored in the storage circuitry on the mobile radio device.

In some configurations the status information is cleared in response to at least one of: a predetermined amount of time; a predetermined distance travelled by the mobile radio device; and a predetermined number of connection attempts by the mobile radio device. In some configurations the status information is cleared in its entirety. In other alternative configurations each item of status information is tagged and is cleared based on the tag. In some configurations the tag is a timestamp and the corresponding item of status information is cleared once a predetermined amount of time has passed. In other alternative configurations the tag is indicative of the number of connection attempts that is incremented each time a connection attempt is made. The corresponding item of status information is then cleared once the tag indicates that the number of connection attempts has exceeded a predetermined number of attempts. In further alternative configurations the tag is indicative of a location of the base station and the status information is cleared once the mobile radio device has travelled greater than a predetermined distance from the base station.

In some example configurations the connection circuitry is configured to make a plurality of attempts to connect to corresponding base stations of the first plurality of base stations by scanning through each of the first plurality of base stations, wherein the attempt to connect is one of the plurality of attempts to connect. The connection circuitry scans through the first plurality of base stations in priority order. In configurations for which the calculation circuitry has defined ranked subsets of base stations the calculation circuitry scans through each of the ranked subsets in order. For example, for configurations in which the configuration circuitry has defined a first and second subset of base stations the connection circuitry scans through the first subset of base stations in order followed by the second subset of base stations in order.

Particular embodiments will now be described with reference to the figures.

The mobile radio device for which the techniques described herein can be utilised can take a variety of forms. For instance, the mobile radio device could be a hand held radio device that can be carried by a pedestrian or in a vehicle. Alternatively, the mobile radio device could take the form of user equipment 12 mounted on a vehicle. The vehicle could take a variety of forms. For example, the techniques could be applied in respect of trains, where the ground terminals may be spread out along a region relatively close to the track. However, for the purposes of the examples discussed herein, it will be assumed that the vehicle is an aircraft, such as the airplane 10 shown in FIG. 1. The airplane 10 is able to communicate with a base station 20 (otherwise referred to as a ground station) which may be one of a network of base stations provided to enable the aircraft 10 to connect to different base stations during a flight in order to seek to maintain a communication link that can be used to provide connectivity to passengers in the aircraft.

Similarly to FIG. 1, FIG. 2 shows an aircraft 10 attempting to establish a connection with a base station 20(A). The aircraft is travelling at a velocity V 14, and at a given angle ϑ 16 to a line connecting the vehicle and the base station. The base station 20(A) is a candidate base station to which the mobile radio device is attempting to establish a connection, and is one of a network of base stations 20 configured to communicate with the aircraft 20. Whilst making the attempt to connect to the base station 20(A) the mobile radio device mounted on the aircraft 10 receives status information relating to other base stations 20 on the network. For example, the mobile radio device mounted on the aircraft 10 may receive status information relating to base station 20(B). The mobile radio device mounted on the aircraft 10 may pick up this information either from the base station 20(B), or may receive data from base station 20(A) during the sign on process that provides status information relating to base station 20(B). If the connection attempt by the mobile radio device mounted to the aircraft 10 to the base station 20(A) is successful then the mobile radio device can communicate with the base station 20(A) until the aircraft 10 has moved out of range. If the connection attempt by the mobile radio device mounted to the aircraft 10 is not successful then the mobile radio device selects a next candidate base station, for example base station 20(B), from a ranked list of candidate base stations that is maintained based on a first list of base stations 20 that are known to the aircraft 10 and the status information obtained during previous connection attempts.

FIG. 3a schematically illustrates a mobile radio device 30 in accordance with some example configurations. The mobile radio device 30 is provided with storage circuitry 32, calculation circuitry 34, selection circuitry 36 and connection circuitry 40. The storage circuitry 32 stores location information 42 and status information 44. The location information 42 defines locations of a network (first plurality) of base stations 20 for the mobile radio device 30 to attempt to connect to. The status information 44 is information that is obtained in relation to the plurality of base stations 20 during an attempt to connect to one of the base stations. The calculation circuitry 34 calculates a ranked list of candidates using the location information 42 and the status information 44 and passes the ranked list to the selection circuitry 36. In some example configurations the calculation circuitry may also store the ranked list in the storage circuitry 32. The selection circuitry 36 selects a next candidate base station from the ranked list of base stations to attempt to connect to. The connection circuitry 40 makes an attempt to establish a connection to one of the plurality of base stations 20. In the illustrated example connection circuitry 40 makes an attempt to establish a connection with base station 20(A) by forming a beam 46 in the direction of base station 20(A).

FIG. 3b schematically illustrates further details of the mobile radio device 30 attempting to establish a connection to base station 20(C) by forming a beam 46 in the direction of base station 20(C). In this case during the attempt to connect to base station 20(C) the connection circuitry 40 forms a beam in a direction of base station 20(C). In addition to base station 20(C), base station 20(D) falls within the beam 46 formed by the connection circuitry 40. In this way the mobile radio device 30 is able to pick up signals from base station 20(D) and is able to generate status information 44 in relation to base station 20(D). If the connection attempt to base station 20(C) failed and the mobile radio device obtained status information suggesting that base station 20(D) is available for connection, the calculation circuitry 34 can update the ranked list to incorporate status information 44 and selection circuitry 36 may select base station 20(D) as a next candidate base station to attempt to connect to.

FIG. 3c schematically illustrates further details of the mobile radio device 30 attempting to establish a connection to base station 20(C) by forming a beam 46 in the direction of base station 20(C). In this case during the sign on process of the attempt to connect to base station 20(C), base station 20(C) transmits data comprising status information relating to further base stations on the network. If base station 20(C) transmits, during the sign on process, data comprising status information of base stations 20(A) and 20(E), the calculation circuitry 34 can update the ranked list to incorporate status information 44 and selection circuitry 36 may select one of base station 20(A) and 20(E) as the next candidate base station to attempt to connect to.

FIG. 4 schematically illustrates further details of the mobile radio device 50 in accordance with some configurations. The mobile radio device 50 is provided with storage circuitry 52, calculation circuitry 54, selection circuitry 56, connection circuitry 58, and beam forming circuitry 60. The storage circuitry 52 stores location information 62, information identifying a first plurality of base stations 64, information identifying a user equipment defined plurality of base stations 66, information defining a network defined plurality of base stations 68 and a ranked list of candidate base stations 70. The location information 62 defines locations of a network of base stations to which the mobile radio device 50 is able to connect. The location information 62 stores locations of base stations that are within connection range of the mobile radio device 50 and that are out of range of the mobile radio device 50. The calculation circuitry 54 calculates the first plurality of base stations 64 based on the location information 62 and the current position of the mobile radio device 50. The current position of the mobile radio device 50 can be determined, for example, using GPS circuitry (not shown). Alternatively, the current location of the mobile radio device could be determined based on a known trajectory, for example, a known flight path, of the mobile radio device or based on known positions of previous base stations to which the mobile radio device has been connected. The first plurality of base stations 64 defines a list of candidate base stations that are suitable for connection with the mobile radio device. For example, the first plurality of base stations could comprise base stations that are currently within a given distance of the mobile radio device or base stations that it is determined, based on a velocity vector of the mobile radio device 50, will remain within a given distance of the mobile radio device for a given time.

The calculation circuitry 54 determines the ranked list of candidates 70 based on the first plurality of candidates 64 and at least one of the user equipment defined plurality of base stations 66 and the network defined plurality of base stations 68. In some example configurations the ranked list of candidates 70 is determined by ranking each entry of the first plurality of base stations 64 into one of four subsets. The first subset comprises base stations that are included in each of the first plurality of base stations 64, the user equipment defined plurality of base stations 66, and the network defined plurality of base stations 68. The second subset comprises base stations that are included in the first plurality of base stations 64 and the network defined plurality of base stations, but that are not present in the user equipment defined plurality of base stations 66. The third subset comprises base stations that are included in the first plurality of base stations 64 and the user equipment defined plurality of base stations 66, but that are not included in the network defined plurality of base stations 68. The fourth subset comprises base stations that are included in the first plurality of base stations 64 but that are not included in either of the user equipment defined plurality of base stations 66 or the network defined plurality of base stations 68. The calculation circuitry 54 may further rank the candidates within the ranked list of candidates based on a connectivity characteristic, for example, a reference signal received power or a received signal-to-interference-and-noise ratio.

The selection circuitry 56 scans through the ranked list of candidates, from the highest priority (highest ranked) candidate base station moving towards the lowest priority (lowest ranked) candidate base station, and instructs the connection circuitry 58 to make an attempt to connect to the selected base station. If the connection is successful then the scanning stops and communication is performed through the connection to the connected base station. If the connection is unsuccessful then the selection circuitry 58 moves on to the next candidate base station in the ranked list of candidates 70.

The mobile radio device 50 is configured to receive, during each connection attempt, data from the base station to which a connection attempt is being made. This data comprises status network defined status information which is passed to the calculation circuitry 54. The calculation circuitry 54 uses the network defined status information to update (generate) the network defined plurality of base stations 68. The mobile radio device 50 is also configured to receive, during each connection attempt, signals from base stations other than the candidate base station and to generate the user equipment defined plurality of base stations 66 from the received signals. In some example configurations the calculation circuitry is configured to update the ranked list of candidates 70 based each time the user equipment defined plurality of base stations 66 or the network defined plurality of base stations 68 is updated. In some alternative example configurations the calculation circuitry is configured to update the ranked list of candidates 70 after a predefined time interval or after the mobile radio device 50 has travelled a predefined distance.

The connection circuitry 58 is configured to control the transmission and reception of signals to and from the base stations. The connection circuitry 58 controls the beam forming circuitry 60 to adjust an angle at which a beam is transmitted by modifying a phase shift between adjacent antenna elements of an antenna array. The beam forming circuitry 60 generates a directed beam that is predominantly directed in the direction of the candidate base station. The directed beam is formed from a linear superposition of signals produced by adjacent antenna elements which constructively interfere to produce the beam in the desired direction. In addition to the beam formed in the desired direction the signals produced by the adjacent antenna elements produce constructive interference in a discrete set of directions other than the desired direction. As a result, the antenna array is able to transmit and receive signals in directions other than the desired direction, thereby enabling the mobile radio device 50 to generate user equipment defined status information for base stations that are visible to the mobile radio device 50 but that are not necessarily located in a same (or similar) direction to the candidate base station to which the attempt to connect is being made.

FIG. 5a schematically illustrates the connection of a mobile radio device 76 to one of a plurality of base stations 20 whilst the wireless radio device 76 is mounted on a aircraft (vehicle) that is in motion. The aircraft travels at a velocity with velocity vector 72(A) along the trajectory 78. The mobile radio device 76 is configured to attempt to establish connection with one of the plurality of base stations 20 within the radio horizon 74(A) using the techniques described herein. In the illustrated example the mobile radio device 76 is in range of base station 20(B), base station 20(C), base station 20(D) and base station 20(F). In the illustrated example, the mobile radio device 76 makes an attempt to connect to base station 20(D). During the attempt to connect to base station 20(D) the mobile radio device 76 obtains user equipment defined status information and network defined status information relating to other base stations 20. For example, the mobile radio device 76 could obtain network defined status information relating to base stations 20(F), 20(B), 20(H), and 20(I). The status information may define a connectivity state of each of the base stations 20(F), 20(B), 20(H), and 20(I). For example, the network defined connectivity information could indicate that base station 20(H) is unable to receive connections whilst base stations 20(F), 20(B), and 20(I) are available to receive connection. Using this information the mobile radio device 76 can update (generate) the network defined plurality of base stations to include base stations 20(F), 20(B), and 20(I) but to exclude base station 20(H).

FIG. 5b schematically illustrates a connection attempt of the mobile radio device 76 at a later position on the trajectory 78. The mobile radio device 76 is in range of base stations 20(H), 20(I) and 20(J) defined by radio horizon 74(B). The mobile radio device prioritises base stations 20(I) and 20(J) above base station 20(H) which is not included in the network defined plurality of base stations. Hence, the mobile radio device makes an attempt to connect to base station 20(I). The mobile radio device 76 is configured to receive, during the attempt to connect to base station 20(I) the mobile radio device 76, status information from base station 20(I). For example, this status information could provide information relating to a connectivity characteristic indicating that base station 20(H) is now available for connections and base station 20(J) is unavailable for connections. Using this information the mobile radio device 76 can update (generate) the network defined plurality of base stations to include base stations 20(H) but to exclude base station 20(J). In this case, if the attempt to connect to base station 20(I) failed, the mobile radio device would prioritise base station 20(H) as the next candidate base station to attempt to connect to as base station 20(H) is now incorporated in the network defined plurality of base stations.

FIGS. 6-9 schematically illustrate the prioritisation of different subsets of base stations based on the information stored in the storage circuitry of the mobile radio device. FIG. 6 schematically illustrates a case in which the ranked candidate list is based on the first plurality of base stations, otherwise referred to as the Database Generated Cell (DGC) list. In this situation the ranked list of candidates is the first plurality of base stations and the connection circuitry scans through the first plurality of base stations. In some embodiments the first plurality of base stations may be prioritised based on a relative location of each base station to the mobile radio device. For example, the ranked list of candidates may prioritise base stations that are closer to the mobile radio device higher than those that are further from the mobile radio device. Alternatively, the ranked list of candidates may prioritise base stations that will remain within the radio horizon of the mobile radio device for a longer time above those that will remain within the radio horizon of the mobile radio device for a shorter time, or based on a predicted connection strength of the candidate base stations.

FIG. 7 schematically illustrates the prioritisation of different subsets of base stations when the first plurality of base stations (DGC list) is combined with the user equipment generated plurality of base stations, otherwise referred to as the User equipment Generated Cell (UGC) list. In this case the ranked list of candidates is comprises all the base stations within the first plurality of base stations (DGC list) prioritised into two subsets: the first subset (A) and the second subset (B). The first subset is defined as the intersection of the first plurality of base stations (DGC list) and the user equipment defined plurality of base stations (UGC list). Mathematically this can be expressed as A=DGC∩UGC, where ∩ is denotes the intersection. In other words, the ranked list of candidates prioritises base stations that appear in both of the first plurality of base stations and the user equipment defined plurality of base stations. The second subset is defined as the intersection of the first plurality of base stations and the complement of the user equipment defined plurality of base stations. Mathematically this can be expressed as B=DGC∩UGC', where UGC' denotes the complement of UGC (all base stations not included in the UGC list). In other words, the second subset of candidates comprises base stations that appear in the first plurality of candidates but that do not appear in the user equipment defined plurality of candidates.

FIGS. 8 and 9 schematically illustrate the prioritisation of different base stations when the first plurality of base stations (DGC list) is combined with the use equipment generated plurality of base stations (UGC list) and a Network Generated Cell (NGC) list. In this case the ranked candidate list comprises all the base stations within the first plurality of base stations (DGC list) prioritised into four subsets: the first subset (A), schematically illustrated in FIG. 9a; the second subset (B), schematically illustrated in FIG. 9b; the third subset (C), schematically illustrated in FIG. 9c; and the fourth subset (D), schematically illustrated in FIG. 9d.

The first subset of candidates is defined as the intersection of the first plurality of base stations, the user equipment defined plurality of base stations, and the network defined plurality of base stations. Mathematically this can be defined as A=UGC ∩ DGC∩NGC. In other words, the first subset comprises candidates that appear in all three of the first plurality of base stations, the user equipment defined plurality of base stations and the network defined plurality of base stations.

The second subset of candidates is defined as the intersection of the first plurality of base stations, the network defined plurality of base stations, and the complement of the user equipment defined plurality of base stations. Mathematically this can be defined as B=UGC'∩(DGC∩NGC). In other words, the second subset comprises base stations that are included in both of the first plurality of base stations and the network defined plurality of base stations, but that are not included in the user equipment defined plurality of base stations.

The third subset of candidates is defined as the intersection of the first plurality of base stations, the user equipment defined plurality of base stations, and the complement of the network defined plurality of base stations. Mathematically this can be defined as C=(UGC∩DGC)∩NGC', where NGC' denotes the complement of the NGC list (all base stations not included in the NGC list). In other words, the third subset comprises base stations that are included in both of the first plurality of base stations and the user equipment defined plurality of base stations, but that are not included in the network defined plurality of base stations.

The fourth subset of candidates is defined as the intersection of the first plurality of base stations, the complement of the user equipment defined plurality of base stations, and the complement of the network defined plurality of base stations. Mathematically this can be defined as D=UGC'∩DGC∩NGC' or D=DGC∩(NGC∪UGC)', where u denotes the union operation and (NGC∪UGC)' denotes the complement of (NGC∪UGC) (all base stations that are not present in either of the NGC list or the UGC list). In other words, the fourth subset comprises base stations that are included in the first plurality of base stations, but that are not included in either of the user equipment defined plurality of base stations or the network defined plurality of base stations.

Hence, it can be seen that the prioritised list of base stations (CC list) is provided by CC list=A∪B∪C∪D. The first-fourth subsets of base stations are prioritised in the ranked list of candidates with the first subset prioritised above the second, third and fourth subsets of base stations. The second subset prioritised below the first subset of base stations and above the third and fourth subsets of base stations. The third subset of base stations is prioritised below the first and second subsets of base stations and is prioritised above the fourth subset of base stations. The fourth subset of base stations is prioritised below the first, second and third subsets of base stations.

FIG. 10 schematically illustrates a sequence of steps carried out by the mobile radio device when establishing a connection with a base station. A candidate base station is selected from the ranked list of candidates 86, otherwise referred to as the Cell Candidate (CC list). The ranked list of candidates 86 is defined by prioritising base stations of the first plurality of base stations (DGC list) 84 by determining which of the first plurality of base stations 84 also appear on each of the network generated plurality of base stations (NGC list) 80 and the user equipment generated plurality of base stations (UGC list) 82 using the above-described techniques. The first plurality of base stations 84 is periodically updated 96 from the antenna gain patterns 90 of the mobile radio device and antenna gain patterns 90 of the base station which may be stored in the storage circuitry on the mobile radio device, the aircraft attitude 92 and the base station locations 94.

The process of establishing a connection with a base station starts at step S10 where a timer is started. The timer sets a predetermined period of time during which each candidate of the ranked list of candidates can only be used once. Flow then proceeds to step S12 where the current first plurality of base stations (CC list) 86 is obtained from the storage circuitry. Flow then proceeds to step S14 where it is determined if the timer has timed out. If yes then flow proceeds to step S34 where a list of used candidates is cleared before flow returns to step S10. If at step S14 it was determined that the timer has not timed out flow proceeds to step S16. At step S16 it is determined if all the candidates in the ranked list of candidates (CC list) 86 have been used. In other words, it is determined if there are any remaining candidates in the ranked list of candidates which the mobile radio device has not made an attempt to connect to. If yes then flow proceeds to step S34 where the list of used candidates is cleared before flow returns to step S10. If at step S16 it was determined that there are still unused candidate base stations in the ranked list of candidates (CC list) 86 then flow proceeds to step S18. At step S18 the highest ranked unused candidate is selected from the ranked list of candidates (CC list) 86. Flow then proceeds to step S20 where an attempt is made to connect to the candidate base station. The connection circuitry controls the antenna array to steer a beam in the direction of the candidate base station and deploys Doppler corrections to correct the frequency of the transmitted beam based on the relative velocity of the aircraft. Flow then proceeds to step S22, where it is determined if the initial access of the connection attempt was successful. If no then flow proceeds to step S40 where the candidate is marked as used. Flow then proceeds to step S38 where it is determined whether the mobile radio device (UE) has detected any additional Physical Cell IDs (PCIs) during the attempt to connect. Flow then proceeds to step S36 where the user equipment generated plurality of base stations (UGC list) 82 is updated to include the PCIs of base stations detected during the attempt to connect. Flow then returns to step S12 where an updated ranked list of candidates (CC list) 86 is obtained. If however, at step S22, the initial access was successful then flow proceeds to step S24 where network generated status information is obtained and used to update the network generated plurality of base stations (NGC list) 80. In some example configurations the network generated status information includes SIB3 (System Information Block type 3) information and SIB4 (System Information Block type 4) information containing information of the intra-frequency and inter-frequency base stations for base station selection. Flow then proceeds to step S26 where it is determined whether bi-directional communication is established. If no then flow returns to step S40 as described previously. If however, at step S26, it is determined that bi-directional communication is established then flow proceeds to step S28 where both the user equipment generated plurality of base stations (UGC list) 82 and the network generated plurality of base stations (NGC list) are cleared. Flow then proceeds to step S30 where the timer is stopped. Flow then proceeds to step S32 where the mobile radio device waits to receive an indication from the base station that the connection is complete. In some example configurations the indication is a RRCReconfiguraiton Complete message. As soon as the RRCReconfiguraiton Complete message is sent by the candidate base station the mobile radio device is connected and the flow is complete.

FIG. 11 schematically illustrates a sequence of steps carried out by a mobile radio device according to some example configurations. In step S100 the mobile radio device stores location information defining locations of a first plurality of base stations. In step S102 the mobile radio device attempts to connect to a candidate base station of the first plurality of base stations using a beam steered in a direction of the candidate base station, and to receive signals from the direction of the candidate base station. In step S104 the mobile radio device generates, based on the received signals, status information defining a connectivity characteristic of each of a second plurality of base stations, and to calculate a ranked list of candidate base stations from the first plurality of base stations and the second plurality of base stations. At step S106 the mobile radio device selects a next candidate base station to attempt to connect to based on the ranked list of candidates.

In some example configurations the above-described techniques may be carried out on a computing device of a more generic configuration and such a device 100 is schematically illustrated in FIG. 12. The general purpose computing device 100 includes a central processing unit 102, a random access memory 104, a read-only memory 106, a network interface card 108, a hard disk drive 110, a display driver 112 and monitor 114, and a user input/output circuit 116 with a keyboard 118 and mouse 120, all connected via a common bus 122. In operation the central processing unit 102 will execute computer program instructions that may be stored in one or more of the random access memory 104, the read-only memory 106 and the hard disk drive 110 or dynamically downloaded via the network interface card 108. The results of the processing performed may be displayed to a user via the display driver 112 and the monitor 114. User inputs for controlling the operation of the general purpose computer 100 may be received via the user input output circuit 116 from the keyboard 118 or the mouse 120. It will be appreciated that the computer program could be written in a variety of different computer languages. The computer program may be stored and distributed on a recording medium or dynamically downloaded to the general purpose computer 100. When operating under control of an appropriate computer program, the general purpose computing device 100 can perform the above described techniques of base station zone configuration determination and can be considered to form an apparatus for performing the above described techniques. The architecture of the general purpose computing device 100 could vary considerably and FIG. 12 is only one example.

Alternatively, the above-described techniques may be implemented in a more distributed fashion, wherein the general purpose computing device 100 illustrated in FIG. 12 may be expanded and/or replaced by an infrastructure comprising components implemented on separate physical devices, the separate physical devices sharing the processing required to carry out these techniques. Such separate physical devices may be physically proximate to one another, or may even be located at entirely different physical locations. In some configurations such an infrastructure is termed a 'cloud computing' arrangement.

In brief overall summary there is provided a mobile radio device and a method of operating a mobile radio device. The mobile radio device is provided with storage circuitry to store location information defining locations of a first plurality of base stations. The mobile radio device is further provided with connection circuitry to make an attempt to connect to a candidate base station of the first plurality of base stations using a beam steered in a direction of the candidate base station, and to receive signals from the direction of the candidate base station. The mobile radio device is further provided with calculation circuitry to generate, based on the received signals, status information defining a connectivity characteristic of each of a second plurality of base stations, and to calculate a ranked list of candidate base stations from the first plurality of base stations and the second plurality of base stations. The mobile radio device is further provided with selection circuitry to select a next candidate base station to attempt to connect to based on the ranked list of candidates.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. A mobile radio device comprising:
   storage circuitry to store location information defining locations of a first plurality of base stations;
   connection circuitry to determine a direction of a candidate base station of the first plurality of base stations using the location information, and to make an attempt to connect to the candidate base station of the first plurality of base stations using an antenna array configured to transmit a beam steered in the direction of the candidate base station, and to receive signals from the direction of the candidate base station;
   calculation circuitry to generate, based on the received signals obtained while making the attempt to connect to the candidate base station, status information defining a connectivity characteristic of each of a second plurality of base stations, and to calculate a ranked list of candidate base stations from the first plurality of base stations and the second plurality of base stations; and
   selection circuitry to select a next candidate base station to attempt to connect to based on the ranked list of candidates.

2. The mobile radio device of claim 1, wherein:
   the status information comprises user equipment generated status information defining a user equipment defined plurality of base stations; and
   the user equipment generated status information is generated by the control calculation circuitry during the attempt to connect to the candidate base station based on signals received from all base stations visible to the mobile radio device in the direction of the candidate base station.

3. The mobile radio device of claim 2, wherein the calculation circuitry is configured to generate the ranked list of candidates such that:
the ranked list of candidates prioritises a first subset of candidates ranked ahead of a second subset of candidates;
the first subset of candidates comprises an intersection of the first plurality of base stations and the user equipment defined plurality of base stations; and
the second subset of candidates comprises the first plurality of base stations excluding the user equipment defined plurality of base stations.

4. The mobile radio device of claim 2, wherein the calculation circuitry is configured to rank the second subset of candidates based on a metric of predicted connection strength of each of the second subset of candidates.

5. The mobile radio device of claim 2, wherein:
the status information comprises network generated status information received by the mobile radio device from the candidate base station defining a network defined plurality of base stations; and
the network generated status information is generated based on data encoded within a signal received from the candidate base station during a sign-on process of the attempt to connect to the candidate base station.

6. The mobile radio device of claim 5, wherein the calculation circuitry is configured to generate the ranked list of candidates such that:
the ranked list of candidates prioritises a first subset of candidates; and
the first subset of candidates comprising an intersection of the first plurality of base stations, the user equipment defined plurality of base stations, and the network defined plurality of base stations.

7. The mobile radio device of claim 2, wherein the calculation circuitry is configured to rank the first subset of candidates based on the connectivity characteristic of each of the first subset of candidates, and the connectivity characteristic is at least one of:
a reference signal received power; and
a received signal-to-interference-and-noise ratio.

8. The mobile radio device of claim 6, wherein the calculation circuitry is configured to generate the ranked list of candidates such that:
the ranked list of candidates prioritises a second subset of candidates ranked below the first subset of candidates; and
the second subset of candidates comprises an intersection of the first plurality of base stations and the network defined plurality of base stations excluding the user equipment defined plurality of base stations.

9. The mobile radio device of claim 8, wherein the calculation circuitry is configured to rank the second subset of candidates based on a metric of predicted connection strength of each of the second set of candidates.

10. The mobile radio device of claim 8, wherein the calculation circuitry is configured to generate the ranked list of candidates such that:
the ranked list of candidates prioritises a third subset of candidates ranked below the first subset of candidates; and
the third subset of candidates comprises an intersection of the first plurality of base stations and the user equipment defined plurality of base stations excluding the network defined plurality of base stations.

11. The mobile radio device of claim 10, wherein the calculation circuitry is configured to rank the third subset of candidates below the second subset of candidates.

12. The mobile radio device of claim 10, wherein the calculation circuitry is configured to generate the third subset of candidates such that it is ranked based on the connectivity characteristic of each of the third subset of candidates, and the connectivity characteristic is at least one of:
a reference signal received power; and
a received signal-to-interference-and-noise ratio.

13. The mobile radio device of claim 10, wherein the calculation circuitry is configured to generate the ranked list of candidates such that:
the ranked list of candidates prioritises a fourth subset of candidates below the first subset of candidates; and
the fourth subset of candidates comprises each of the first plurality of base stations excluding the network defined plurality of base stations and excluding the user equipment defined plurality of base stations.

14. The mobile radio device of claim 13, wherein the ranked list of candidates prioritises the fourth subset below the second subset of candidates and below the third subset of candidates.

15. The mobile radio device of claim 1, wherein the location information defines the locations of each of the plurality of base stations relative to the mobile radio device.

16. The mobile radio device of claim 1, wherein the plurality of base stations defined in the location information comprises base stations within radio horizon of the mobile radio device.

17. The mobile radio device of claim 1, wherein the mobile radio device is configured to be attached to a mobile vehicle and is configured to dynamically update the location information in the storage circuitry during motion of the mobile vehicle.

18. The mobile radio device of claim 17, wherein the mobile radio device is configured to be mounted on an aircraft and is configured such that the first plurality of base stations is determined from a location of the aircraft, locations of the base stations, and the aircraft velocity vector.

19. The mobile radio device of claim 18, wherein the first plurality of base stations is further based on antenna gain patterns of the beam.

20. The mobile radio device of claim 1, wherein the status information is cleared in response to at least one of:
a predetermined amount of time;
a predetermined distance travelled by the mobile radio device; and
a predetermined number of connection attempts by the mobile radio device.

21. The mobile radio device of claim 1, wherein the connection circuitry is configured to make a plurality of attempts to connect to corresponding base stations of the first plurality of base stations by scanning through each of the first plurality of base stations, wherein the attempt to connect is one of the plurality of attempts to connect.

22. A method of operating a mobile radio device comprising:
storing location information defining locations of a first plurality of base stations;
determining a direction of a candidate base station of the first plurality of base stations using the location information, and attempting to connect to the candidate base station of the first plurality of base stations using an antenna array configured to transmit a beam steered in the direction of the candidate base station, and to receive signals from the direction of the candidate base station;

generating, based on the received signals obtained while making the attempt to connect to the candidate base station, status information defining a connectivity characteristic of each of a second plurality of base stations, and to calculate a ranked list of candidate base stations from the first plurality of base stations and the second plurality of base stations; and selecting a next candidate base station to attempt to connect to based on the ranked list of candidates.

23. A mobile radio device comprising:

means for storing location information defining locations of a first plurality of base stations;

means for determining a direction of a candidate base station of the first plurality of base stations using the location information, and attempting to connect to the candidate base station of the first plurality of base stations using an antenna array configured to transmit a beam steered in the direction of the candidate base station, and to receive signals from the direction of the candidate base station;

means for generating, based on the received signals obtained while making the attempt to connect to the candidate base station, status information defining a connectivity characteristic of each of a second plurality of base stations, and to calculate a ranked list of candidate base stations from the first plurality of base stations and the second plurality of base stations; and means for selecting a next candidate base station to attempt to connect to based on the ranked list of candidates.

* * * * *

UNITED STATES PATENT AND TRADEMARK OFFICE
CERTIFICATE OF CORRECTION

PATENT NO. : 12,289,675 B2
APPLICATION NO. : 17/824519
DATED : April 29, 2025
INVENTOR(S) : Blanca Arcas Serrate et al.

Page 1 of 1

It is certified that error appears in the above-identified patent and that said Letters Patent is hereby corrected as shown below:

In the Claims

In Claim 2, Column 16, Line 66, delete "control" before -- calculation --.

Signed and Sealed this
Twenty-fourth Day of June, 2025

Coke Morgan Stewart
*Acting Director of the United States Patent and Trademark Office*